Patented Jan. 1, 1929.

1,697,262

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF OXIDIZING PETROLEUM OILS.

No Drawing. Application filed August 20, 1924. Serial No. 733,153.

This invention relates to processes of treating gaseous and vaporous substances and particularly those derived from petroleum and mineral oils and their derivatives, by a heat treatment which may or may not involve cracking, but does involve oxidation to produce valuable products.

In carrying out these oxidation processes it is very important to control the several factors entering into and determining them in order to obtain commercially successful processes. Broadly considered from the standpoint of the heat factor which is very influential in determining the course of the reactions in these processes, the latter may be divided into two classes: those in which heat is constantly supplied to the reaction zone; and those in which heat is removed from the reaction zone. In the first type of processes mentioned, heat is constantly supplied to the reaction zone in order to maintain the required reactions. Due to the regulation of the heat supplied, there is not much difficulty in controlling this type of process. In those processes wherein the reaction is allowed to proceed under its own production of heat, the control of the latter is very important. This follows from the fact that the chemical reactions involved in the oxidation of the hydrocarbons to the oxidized derivatives are exothermic, and the heat constantly being produced during these reactions must be removed from the reaction zone so that the accumulation of heat with complete oxidation, etc., may be prevented. The heat control which is thus required is principally based on the maintenance of a balance between the heat of the incoming gases and the heat generated by the oxidation reactions themselves, and the heat carried away by the substances passing out of the oxidation zone, the latter obviously being a function among other things of the speed of the gases, and the radiation and conductance of heat possible under any given set of operating conditions. In small scale operation usually under laboratory conditions, where tubes of small diameter are used, the radiating surface with small catalyst depth (when a catalyst is used) is sufficient to dispel any desired amount of heat, so that actually heat may be required to be supplied to the oxidation zone in order to maintain the temperature therein. Under such conditions obviously, the process could be maintained only by supplying heat constantly to the oxidation zone, and the process would not be self-sustaining. However in larger scale operation, where tubes of larger cross section are used, or where a bundle of small tubes is used so that the radiating surface is measurably reduced, or in processes using catalysts where the catalyst layer is relatively large (it may easily be from eight to nine inches of effective length or depth), the heat generated is more than sufficient to maintain the reaction, and in fact will, in commercial operation be required to be removed. This excess of heat may be removed in a variety of ways among which may be mentioned the addition of diluents such as steam, nitrogen, carbon dioxide, or the products of oxidation themselves preferably after removal of the more valuable products, to the mixture entering the oxidation zone; cooling of the oxidation zone, etc. Decreasing the ratio of oxygen or oxygen containing gas to the materials undergoing oxidation will also serve as a means for reducing the heat generated in the oxidation zone.

This control of heat in the oxidation zone may be effected in any of the ways set forth above used either alone or in conjunction, or by any of the following means, which may also be used when desired with the methods of heat control set forth above. For example, the gases and vapors entering the catalyst chamber may be cooled before they reach the oxidation zone. Such cooling prevents the violent reaction which usually takes place at the moment of contact between the hydrocarbon substances and air with the catalyst. A further result is that such precooling prevents to a large extent, the deposition of carbon in the first layers of the catalyst. Experiments which have been conducted indicate that there is always a considerable degree of activity at the point where the mixture comes into contact with the heated catalytic mass, and besides the precooling referred to, it is also desirable at times, to have the catalytic material of a weaker character in the first portion of the path of travel than it is in the subsequent portion.

Although these processes may be carried out without the use of catalysts, their use is to be preferred. And when used, they may serve as an additional means of disseminating the heat in the reaction zone. In such cases, fragments of metal as iron, aluminum, etc., may be used alone or interspersed with pumice. Metal catalysts such as copper gauze, brass, and the like may be used, which may or may not be coated with the usual catalysts employed in vapor phase oxidations such as vanadium pentoxide, copper oxide, chromium oxide, iron vanadate, silver chromate, etc. or these catalysts may be deposited on the granular particles of iron, aluminum, etc. referred to above. In using such metal base carriers for these catalysts, a double effect is obtained: not only does the oxygen containing catalyst act as a catalyst while the carrier acts as a heat conductor, but the latter also exerts its peculiar catalytic effect. The result is not merely a joint catalytic action which is the summation of the activities of the several catalysts, but the catalysts modify the action of each other favorably, so that the final catalytic effect is often greater and more desirable.

A further method of heat control consists in supplying a cooling medium directly to the catalytic mass. This may be done by providing a cooling coil within the catalytic mass, and passing the cooilng medium through the coil. Or the catalytic zone may be made up of a number of tubes which in one instance contains the cooling medium, the tubes preferably being vertical and ending in a layer of catalytic material. Preferably however, a series of tubes containing the catalytic material over or through which the gaseous or vaporous mixture undergoing oxidation passes, are immersed within a bath of liquid or other cooling medium. In the preferred case, the cooling medium will be a liquid whose boiling point is somewhat adjacent to the temperature at which it is desired to maintain the catalytic zone. As heat is generated which would normally accumulate until the catalytic or oxidation zone was raised to an undesired temperature, the liquid material present will absorb this heat, becoming vaporized in the process. Provision may be made for carrying the vapors of the vaporized or gasified cooling medium out of the reaction zone to a condenser, where upon condensation, the condensate is again fed back to the cooling zone. Such condensation and re-use of the cooling medium may be made to take place automatically. As substances which may be used in the cooling zone there may be mentioned water, mercury, sulphur, waxes, paraffin, fats, oils, and particularly mineral oils such as are used in the cracking zone in one stage of the disclosed process. The heat carried off from the oxidation zone may be utilized in various ways. For example the gas or vapor mixture passing to the oxidation zone may be passed along the tubes or through them depending on which modification of the cooling process set forth above is used, preferably in counter current to the vapors or liquid used as a cooling medium. Or the heated vapors may be passed to a boiler for the generation of steam. However when the mineral or petroleum oil is used as the cooling medium, the arrangement will preferably be such that the oil is passed in counter current to the gases or vapors undergoing oxidation, so that the oil is preheated, and then cracked by the heat generated in the oxidation zone. The cracked material thus produced may be directly fed into the oxidation zone, after mixture with oxygen or air, cooling the mixture if necessary, and with or without diluents as desired. In these modifications, it is desirable for the best results, to have a down-feed of the vapors and gases to the oxidation zone. Further the pressure used may be varied from sub-atmospheric to super-atmospheric in order to maintain the temperature in the catalytic zone within wide limits.

In these oxidation processes, any mineral or petroleum oil, or related substance may be subjected to treatment by heat, either with or without cracking, followed by an oxidation treatment of the vapors and gases thus produced. Where desired, the oils may be first purified as from sulphur compounds, or a purification step may be used on the gases and vapors generated in the heat treatment process, and before the oxidation treatment. The temperatures used in the oxidation zone are very important, and of course are closely related to the pressures used therein. The temperature should preferably be below about 532° C. and preferably above 200–250° C. Higher temperatures result in considerable burning up of the material being treated, while at temperatures below 200° C. the process is rather slow. With lower temperatures, higher pressures are desirable. Since the gases coming from the cracking zone may be under pressure they may be directly utilized under high pressure in an oxidation zone at the lower temperatures, and even at temperatures from 100–200° C. The petroleum etc. material may be supplied to the oxidation zone if desired, in the form of a mist or cloud. This fine mist or cloud, which may be formed from the vapor or gas mixture by cooling, does not oxidize so readily as when largely or entirely in the vapor state, so that it may be carried well into the catalytic mass before considerable oxidation begins to take place. Thus as pointed out above, a further distribution or dissemination of heat is secured. Any or all of the various methods of controlling the temperature in the oxidation zone may be used, and if desired, the pipe conducting the vapors and gases to the catalytic zone may be lagged; or that pipe may be surrounded with a cooling jacket; or counter current may be used with oxidation under pressure without a catalyst as set forth above.

As illustrative of the methods of carrying out this invention the following examples are given. Oil gas is mixed with air in quantity somewhat in excess of that required to oxidize the hydrocarbons present therein to intermediate oxidation products such as aldehydes or fatty acids, and the mixture is passed over a spiral of copper gauze which is maintained at a temperature just below a red heat. The products issuing from the catalytic chamber are passed into a suitable absorbing agent for water soluble substances and fatty acids may be removed if desired by an alkaline absorbing agent. In place of copper gauze, other catalysts specified above may be used. For example granular aluminum coated with vanadium oxide may be used in place of the copper gauze. Preferably the catalytic chamber is arranged to regenerate the heat, that is to say, the incoming air and vapors may be passed about the catalytic chamber in such a manner as to cool the latter and avoid excessive temperature therein. Steam or other inert gas may also be used to dilute the oil gas and air mixture entering the catalytic chamber.

As a further example of the application of the inventions, the following additional example is given. Kersosene was allowed to drip at a regular rate of flow into the cracking furnace which was maintained at a cracking temperature preferably between 500 and 600° C. The cracked vapor was passed through an air cooled condenser and the high boiling oils condensed and collected in a suitable receiver. When it is not desired to separate these higher boiling oils, the condensation step may be omitted. The cracked vapors were then passed into a Venturi tube where they were mixed with the air supply. The air supply was obtained by means of a positive pressure blower and was first passed through a gas meter, then through a gas scrubbing tower containing copper sulphate to remove sulphur compounds, and into a gas scrubbing tower containing sulphuric acid in order to remove any moisture present in the air. Finally the dried air was passed into a humidifying tower containing water in order that the air should have a definite content of water throughout the remainder of the operation. The air was then passed on into the mixing chamber or Venturi tube where it was thoroughly mixed with cracked oil vapors. If not sufficiently cooled the mixture of cracked oil and air may be passed through a water cooled condenser or other cooling device and on into the oxidizing chamber. The cloud entering the oxidizing chamber was approximately at room temperature.

The cool mixture of air and oil mist was passed through one leg of a U tube containing pumice and then through the other leg of the U tube containing pumice coated with oxide of vanadium. (The oxide of vanadium coated pumice was prepared by impregnating suitable sized pumice granules, namely between 5 and 10 mesh with a solution of ammonium metavanadate containing 10 per cent of vanadium by weight of the pumice. The entire mass was taken to dryness and heated at a temperature of 325–350° C. in the catalytic chamber while air was passed through the mass until the ammonium salt was completely converted.)

With the lead bath at a temperature of 425–450° C. the temperature of the exit gases at a point just above the catalytic mass was 320–360° C. The gas stream containing the oxidized petroleum was passed through a condenser where a considerable portion of the condensable material was condensed and the condensate collected in a receiving vessel. The stream containing considerable material in the form of a cloud or mist was scrubbed by passing through a gas scrubbing tower containing oil where the bulk of the oil soluble material was removed. Finally the stream was passed through a water scrubbing tower which removed a considerable quantity of water soluble material from the gas and the residue of the mist was recovered by passing through a tower containing silica gel.

The receiver in which the condensed vapors were collected contained a condensate which separated into two layers, a water soluble layer and an oily layer, both of which has a distinctly acid reaction. The volume of the aqueous solution in the condensing tower was four times that removed from the gas humidifying tower. The oil condensed and scrubbed from the gas stream by the tower was about twelve and a half per cent of the original quantity of the oil passed into the cracking chamber. The oil condensed between the Venturi tube and cracking furnace was about twenty per cent of the kerosene passed into the furnace. The ratio of air to kerosene passed through the apparatus was about 34 cubic feet per liter of kerosene. Among the products of oxidation, substantial amounts of phthalic anhydride were found. The products of cracking set forth in this example included aromatic as well as paraffin hydrocarbons with the result that oxygenated derivatives of both the paraffin and the aromatic hydrocarbons were produced. Among such products may be mentioned aromatic and fatty acids, aldehydes etc.

While cracked petroleum is preferred herein owing to its reactive properties, I do not limit myself thereto but may form a cloud or mist from uncracked petroleum products, mix the same with air or oxygen, and treat the mixture in a reaction zone or contact mass, where, in the preferred form of this process, the cool mixture is suddenly brought to the reaction temperature (preferably below a low red heat) in the presence of contact material. While processes involving catalytic bodies are preferred, the latter may be omitted. Further, kerosene has been mentioned herein in an illustrative way, but it should by no means be understood as limiting, as other light or heavy petroleum oils, residues, and the like may be treated, as well as asphalt, gilsonite, fats, and greases. The temperature used in the cracking zone may vary, and may be increased substantially above that mentioned in the example, or decreased, such changes in temperature varying with the pressure used therein. In these modifications for example a relatively high pressure as for example 10 to 20 atmospheres and a relatively high temperature as for example 400 to 900° C. may be used. The higher temperatures favor the formation of cyclic bodies. But the use of high temperatures and high pressures require special materials of construction to be suitably resistant. In most cases a compromise has to be made between the desired high temperatures and pressures in view of the need of utilizing equipment already in place. When cracking by pressure processes such as the "tube and tank" method involving the use of a heating coil and a digesting tank a considerably higher temperature may be reached in the coil than is needful in the digesting tank. Thus in the coil the oil may be superheated so to speak, the temperature being above the normal cracking point which is desirable for the formation of cyclic bodies. The temperature in the coil is preferably above 500° C. Variation in the temperature enables cyclic bodies to be formed selectively, for example a temperature of say 600° C. will yield a predominating amount of single ring hydrocarbons, such as benzol, while a temperature of say 700 to 750° C. will yield a substantial proportion of hydrocarbons of the naphthalene type. Of course the ratios between the kind of cyclic bodies formed varies to some extent not only with the temperatures employed but also with the nature of the oils obtained from different sources. But with any given oil the nature of the cyclicization may be governed in a general way by the foregoing rule. In the processes as preferably carried out, an insufficient amount of oxygen or air is used and hence a substantial proportion of the hydrocarbons produced by cracking or originally present in the oil may pass through the oxidation zone, substantially unoxidized. After separation of valuable compounds, the remainder may be re-treated in the oxidation zone or may be used as fuel. Further when an insufficient amount of oxygen or air is used to oxidize all of the hydrocarbon or substantially all of it to intermediate compounds, higher temperatures may be used, and may even run above the temperature of a low red heat referred to above. In such cases, the control of those processes wherein the process is made self-sustaining by utilizing the heat of the reaction to keep up the temperature in the oxidation zone is rendered simpler when an insufficient amount of oxygen for complete combustion is present. A similar result is obtained when the speed of the gases through the oxidation zone is kept high so that the gases are swept through the oxidation or catalytic zone fairly rapidly. But the speed of the gases through the reaction zone is intimately related to the length or depth of the catalyst layer or of the oxidation zone, since with longer contact with a catalyst as when a considerable depth of catalyst layer is used, an increase in speed of the reaction gases will give an effect similar to reduction in the effective depth of the catalyst zone. And vice versa, with a decrease in effective length of catalyst layer, a decrease in the speed of the gases thereover or therethrough will increase the resulting effective contact between the catalyst and the gases undergoing oxidation.

A further important feature of this invention is the discovery that the amount of aromatic derivatives produced appears to be related to the amount of naphthenes in the original oil, larger quantities of naphthene containing oils giving larger quantities of aromatics than those oils which are relatively free of naphthenes. The naphthenes are relatively stable compounds having many of the properties of the paraffins, and in many properties being more closely related to the paraffins than to the benzenoid hydrocarbons. Accordingly upon oxidation, they appear to undergo oxidation first forming dehydrogenated compounds, which on further oxidation pass into alcohols, aldehydes, and acids, etc. of the aromatic derivatives, containing for the most part six membered rings, the rings themselves do not appear to be broken up upon oxidation, but the oxidation takes place primarily in the groups attached to the carbon nucleus. Taking advantage of this property of the naphthenes, when it is desired to produce larger quantities of the aromatic derivatives by the processes described above, it is desirable to use oils of an asphaltic base such as those obtained from the western part of the United States. But a still further advantage in this connection is obtained by treating the oils so that the proportion of naphthenes present is increased relatively to the other hydrocarbon groups present in the oil. For example by the action of such solvents as sulphur dioxide, alcohol, etc., particularly at low temperatures, it is possible to separate many of the paraffin hydrocarbons without substantially removing the aromatics or naphthenes present. Similar results may be obtained by careful distillation. The oils thus having an increased percentage of naphthenes, may be subjected to oxidation as set forth above, either with or without a preliminary cracking step. Or the oils may be originally cracked, then treated to increase the aromatics and naphthenes present, and then subjected to oxidation treatments by the processes outlined above.

This application is a continuation in part of my applications Serial Nos. 284,372, 538,338, 523,208 and 703,980.

What I claim is:—

1. In the process of catalytic oxidation of petroleum hydrocarbons, the step which comprises passing a reaction mixture of petroleum vapor and air over a catalytic mass maintained at a black heat just below a red heat by cooling the catalytic mass.

2. In the process of catalytic oxidation of petroleum hydrocarbons, the step which comprises passing the reaction mixture of petroleum vapor and air over a catalytic mass maintained at a black heat just below a low red heat under conditions of self-sustaining combustion.

3. In the process of making partial combustion products, steps consisting of mixing finely divided petroleum oil with air in measured amount, passing the mixture in contact with a catalyst and maintaining the catalyst at a temperature below a red heat under conditions of self-sustaining combustion.

4. The process of making partial combustion products, which comprises vaporizing petroleum oil, mixing oxygen and diluent with these vapors, and passing the mixture through a catalyst maintained at a temperature below a red heat under conditions of self-sustaining combustion.

5. In the process of making partial combustion products, the steps which consist of passing a mixture of petroleum oil vapor and air through a catalyst at a temperature below a red heat under conditions of self-sustained combustion.

6. In the process of making partial combustion products, the steps consisting of passing a mixture of heated petroleum oil vapor, air and a diluent through a reaction zone at a temperature below a red heat under conditions of self-sustained combustion.

7. In the catalytic oxidation of petroleum oils the step which comprises passing a mixture of petroleum oil vapor and air over a composite catalyst containing two active oxidizing agents maintained at a black heat approaching red heat under conditions of self-sustained combustion.

8. The process of producing valuable oxidation products including aromatic derivatives, which comprises subjecting hydrocarbons containing naphthenes to oxidation under conditions of self-sustaining combustion.

9. The process of producing valuable oxization products including aromatic derivatives which comprises subjecting petroleum vapors containing naphthenic hydrocarbons to oxidation while abstracting heat from the oxidation zone.

10. The process of producing valuable oxidation products containing aromatic derivatives which comprises enriching the naphthenic hydrocarbon content of an asphaltic base oil and then subjecting the resulting oil to oxidizing conditions.

11. The process of producing valuable oxidation products containing aromatic derivatives which comprises cracking a mineral oil, enriching the naphthenic hydrocarbon content of the cracked oil, and then subjecting the treated oil to oxidizing conditions.

12. A process as set forth in claim 8 in which the oxidation step is carried out at a black heat just below a red heat.

13. A process as set forth in claim 11 in which the oxidizing treatment is carried out at a black heat just below a red heat.

14. A process as set forth in claim 8 in which the oxidation step is carried out at a temperature below a red heat.

15. A process as set forth in claim 11 in which the oxidizing treatment is carried out at a temperature below a red heat.

16. A process as set forth in claim 10 in which the oxidizing treatment is carried out at a temperature below a red heat while cooling the zone in which oxidizing treatment is carried out.

17. The process of producing valuable products from petroleum oil which comprises cracking petroleum oil and subjecting the cracked products to oxidation while extracting heat from the oxidation zone.

18. In a partial combustion process, the steps consisting in passing a mixture of oil vapors and air through a catalyst, supplying heat, and artificially cooling the catalyst zone to keep the reaction temperature within the desired limits of partial combustion.

19. In a partial oxidation process, the steps consisting in partially oxidizing petroleum oil vapors by air, and extracting heat from the oxidation zone during the said oxidation.

20. In a partial oxidation process, the steps consisting in partially oxidizing petroleum oil vapors by air, and extracting heat from the oxidation zone during the said oxidation by a cooling agent applied directly to said oxidation zone.

21. In the process of producing partial oxidation products by oxidation of hydrocarbons in an oxidation zone, the step of cooling the reaction mixture containing hydrocarbons to be oxidized prior to its passage into the oxidation zone.

22. In the process of producing partial oxidation products by oxidation of hydrocarbons in an oxidation zone, the step of abstracting heat from the reaction mixture containing hydrocarbons just prior to its entrance into the oxidation zone.

23. In a partial oxidation process, the steps consisting in partially oxidizing petroleum vapors by air at a temperature below a red heat, and extracting heat from the oxidation zone during the said oxidation.

24. A process as set forth in claim 19 carried out under spueratmospheric pressure.

25. In a partial oxidation process, the step consisting in oxidizing petroleum vapor with air under conditions of self-sustained combustion at pressures above atmospheric to form partial oxidation products.

CARLETON ELLIS.

DISCLAIMER 1,697,262.—*Carleton Ellis*, Montclair, N. J. PROCESS OF OXIDIZING PETROLEUM OILS. Patent dated January 1, 1929. Disclaimer filed November 25, 1935, by the assignee, *Ellis-Foster Company*.

Hereby enters this disclaimer to that part of the claim in said specification which is in the following words, to wit: Your Petitioner does hereby disclaim from claims 2–8, inclusive, 12 and 14, all processes of treating hydrocarbons except those in which the process is carried out under superatmospheric pressure.

[*Official Gazette December 31, 1935.*]

ing heat from the reaction mixture containing hydrocarbons just prior to its entrance into the oxidation zone.

23. In a partial oxidation process, the steps consisting in partially oxidizing petroleum vapors by air at a temperature below a red heat, and extracting heat from the oxidation zone during the said oxidation.

24. A process as set forth in claim 19 carried out under spueratmospheric pressure.

25. In a partial oxidation process, the step consisting in oxidizing petroleum vapor with air under conditions of self-sustained combustion at pressures above atmospheric to form partial oxidation products.

CARLETON ELLIS.

DISCLAIMER 1,697,262.—*Carleton Ellis*, Montclair, N. J. PROCESS OF OXIDIZING PETROLEUM OILS. Patent dated January 1, 1929. Disclaimer filed November 25, 1935, by the assignee, *Ellis-Foster Company*.

Hereby enters this disclaimer to that part of the claim in said specification which is in the following words, to wit: Your Petitioner does hereby disclaim from claims 2-8, inclusive, 12 and 14, all processes of treating hydrocarbons except those in which the process is carried out under superatmospheric pressure.

[*Official Gazette December 31, 1935.*]